(12) United States Patent
Ishikawa et al.

(10) Patent No.: US 10,053,786 B2
(45) Date of Patent: Aug. 21, 2018

(54) DIFFERENTIAL PRESSURE WATER ELECTROLYSIS SYSTEM

(71) Applicant: HONDA MOTOR CO., LTD., Tokyo (JP)

(72) Inventors: Hiroyuki Ishikawa, Wako (JP); Eiji Haryu, Wako (JP); Hayato Daimon, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 14/923,437

(22) Filed: Oct. 27, 2015

(65) Prior Publication Data

US 2016/0122885 A1 May 5, 2016

(30) Foreign Application Priority Data

Nov. 5, 2014 (JP) .................................. 2014-225260

(51) Int. Cl.
- C25B 9/00 (2006.01)
- C25B 1/04 (2006.01)
- C25B 9/18 (2006.01)
- C25B 1/12 (2006.01)
- C25B 13/08 (2006.01)

(52) U.S. Cl.
CPC ................ *C25B 9/18* (2013.01); *C25B 1/12* (2013.01); *C25B 13/08* (2013.01); *Y02E 60/366* (2013.01)

(58) Field of Classification Search
CPC .... C25B 9/18; C25B 1/04; C25B 1/12; C25B 9/00; Y02E 60/366
USPC ....................................................... 204/257
See application file for complete search history.

(56) References Cited

U.S. PATENT DOCUMENTS

2014/0151217 A1* 6/2014 Nakazawa ................ C25B 9/08
204/266

FOREIGN PATENT DOCUMENTS

JP 2010-196133 9/2010

* cited by examiner

*Primary Examiner* — Zulmariam Mendez
(74) *Attorney, Agent, or Firm* — Mori & Ward, LLP

(57) ABSTRACT

A differential pressure water electrolysis system includes high-pressure water electrolysis cells, first and second end plates, and a high pressure hydrogen manifold. The high pressure hydrogen manifold is provided to distribute hydrogen in a stacking direction. Each of the high-pressure water electrolysis cells includes an electrolyte membrane, an anode current collector, a cathode current collector, an anode separator, a cathode separator, an elastic member, a manifold member, and a cylindrical porous member. The manifold member is disposed between the anode separator and the electrolyte membrane to surround the high pressure hydrogen manifold and includes a seal chamber in which a sealing member is disposed to encircle and seal the high pressure hydrogen manifold. The cylindrical porous member is disposed in the manifold member between the seal chamber and the high pressure hydrogen manifold.

14 Claims, 5 Drawing Sheets

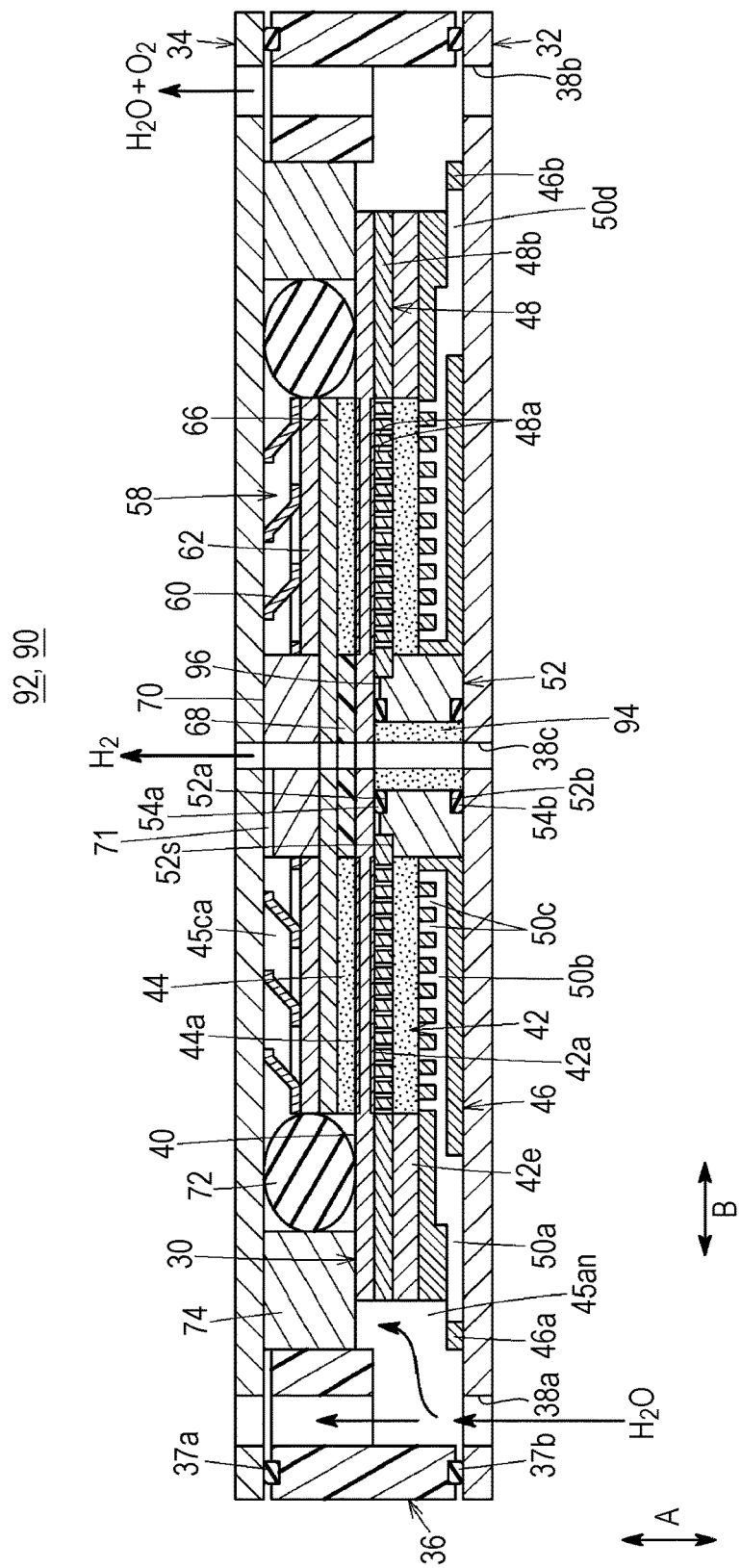

DIFFERENTIAL PRESSURE WATER ELECTROLYSIS SYSTEM

CROSS-REFERENCE TO RELATED APPLICATIONS

The present application claims priority under 35 U.S.C. § 119 to Japanese Patent Application No. 2014-225260, filed Nov. 5, 2014, entitled "Differential Pressure Water Electrolysis System." The contents of this application are incorporated herein by reference in their entirety.

BACKGROUND

1. Field

The present disclosure relates to a differential pressure water electrolysis system.

2. Description of the Related Art

Typically, hydrogen gas is used as a fuel gas used to perform a power generation reaction in a fuel cell. The above hydrogen is produced by a water electrolyzer, for example. The water electrolyzer uses a solid polymer electrolyte membrane (an ion-exchange membrane) for generating hydrogen (and oxygen) through electrolysis of water.

An electrode catalyst layer is provided on both surfaces of the solid polymer electrolyte membrane such that an electrolyte membrane-electrode structure is configured, and a current collector is disposed on both sides of the electrolyte membrane-electrode structure such that a water electrolysis cell is configured.

In a water electrolyzer in which a plurality of water electrolysis cells are stacked, voltage is applied to both ends in the stacking direction and water is supplied to an anode current collector. Accordingly, water is electrolyzed and hydrogen ions (protons) are generated on the anode side of the electrolyte membrane-electrode structure, the hydrogen ions permeate the solid polymer electrolyte membrane and is transferred to the cathode side, and the hydrogen ions are combined with the electrons in a cathode current collector such that hydrogen is produced. Meanwhile, on the anode side, oxygen that has been generated together with hydrogen is discharged from the water electrolyzer together with surplus water.

As the water electrolyzer, a differential pressure water electrolysis system that, while producing oxygen on the anode side, produces, on the cathode side, hydrogen that has a higher pressure with respect to the pressure of the oxygen by electrolyzing water is employed. Specifically, current collectors are provided on both sides of the solid polymer electrolyte membrane and separators are stacked on the current collectors and, further, a first flow passage that supplies water is formed between one of the current collectors and one of the separators. Furthermore, a second flow passage that obtains hydrogen generated through electrolysis of water and that has a high-pressure that is higher than the normal pressure is formed between the other current collector and the other separator.

In the above type of differential pressure water electrolysis system, when the pressure of the second flow passage having a high-pressure is released, the pressure in the seal groove that is in communication with the second flow passage can be released in a preferable manner, and an electrochemical device disclosed in Japanese Unexamined Patent Application Publication No. 2010-196133 that aims to prevent damage to the electrolyte membrane to the extent possible is known. The above electrochemical device includes a high-pressure fluid manifold that is in communication with the second flow passage and that extends in the stacking direction of the separator.

One of the separators includes a seal groove that encircle the outside of the high-pressure fluid manifold and in which a sealing member is inserted, and an opening portion that communicates the high-pressure fluid manifold and the seal groove to each other. Furthermore, the other separator includes a seal groove that encircle the outside of the second flow passage and in which a sealing member is inserted, and an opening portion that communicates the second flow passage and the seal groove to each other.

Now, when the pressure of the high-pressure fluid manifold is released, the pressure in the seal groove is released in a desirable manner through the opening portion that directly communicates the seal groove and the high-pressure fluid manifold to each other. With the above, it is stated that when releasing pressure, no difference in pressure occurs between the high-pressure fluid manifold and the seal groove and drastic transfer of the high-pressure fluid from the seal groove to the high-pressure fluid manifold and be prevented in a reliable manner.

SUMMARY

According to one aspect of the present invention, a differential pressure water electrolysis system includes high-pressure water electrolysis cells, first and second end plates, and a high pressure hydrogen manifold. The high-pressure water electrolysis cells are stacked in a stacking direction to form a fuel cell stack having a first end and a second end opposite to the first end in the stacking direction. The first and second end plates are disposed at the first and second ends of the fuel cell stack, respectively. The high pressure hydrogen manifold is provided to distribute hydrogen in the stacking direction. Each of the high-pressure water electrolysis cells includes an electrolyte membrane, an anode current collector, a cathode current collector, an anode separator, a cathode separator, an elastic member, a manifold member, and a cylindrical porous member. The anode current collector and the cathode current collector hold the electrolyte membrane between the anode current collector and the cathode current collector. The anode separator defines an anode chamber in which the anode current collector is accommodated. The cathode separator defines a cathode chamber in which the cathode current collector is accommodated. The elastic member is disposed between the cathode current collector and the cathode separator to press the cathode current collector against the electrolyte membrane. The manifold member is disposed between the anode separator and the electrolyte membrane to surround the high pressure hydrogen manifold and includes a seal chamber in which a sealing member is disposed to encircle and seal the high pressure hydrogen manifold. The cylindrical porous member is disposed in the manifold member between the seal chamber and the high pressure hydrogen manifold. Each of the high-pressure water electrolysis cells is to electrolyze water that has been supplied to each of the high-pressure water electrolysis cells to generate oxygen on an anode current collector side and generate the hydrogen having a pressure higher than a pressure of the oxygen on a cathode current collector side.

According to another aspect of the present invention, a differential pressure water electrolysis system includes high-pressure water electrolysis cells, first and second end plates, a high pressure hydrogen manifold, and a cylindrical porous member. The high-pressure water electrolysis cells are stacked in a stacking direction to form a fuel cell stack having a first end and a second end opposite to the first end in the stacking direction. The first and second end plates are disposed at the first and second ends of the fuel cell stack, respectively. The high pressure hydrogen manifold is provided to distribute hydrogen in the stacking direction. Each of the high-pressure water electrolysis cells includes an electrolyte membrane, an anode current collector, a cathode current collector, an anode separator, a cathode separator, an elastic member, and a manifold member. The anode current collector and the cathode current collector hold the electrolyte membrane between the anode current collector and the cathode current collector. The anode separator defines an anode chamber in which the anode current collector is accommodated. The cathode separator defines a cathode chamber in which the cathode current collector is accommodated. The elastic member is disposed between the cathode current collector and the cathode separator to press the cathode current collector against the electrolyte membrane. The manifold member is disposed between the anode separator and the electrolyte membrane to surround the high pressure hydrogen manifold and includes a seal chamber in which a sealing member is disposed to encircle and seal the high pressure hydrogen manifold. The cylindrical porous member extends between the first and second end plates and is integrally disposed between the seal chamber and the high pressure hydrogen manifold. Each of the high-pressure water electrolysis cells is to electrolyze water that has been supplied to each of the high-pressure water electrolysis cells to generate oxygen on an anode current collector side and generate the hydrogen having a pressure higher than a pressure of the oxygen on a cathode current collector side.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is an explanatory drawing illustrating a sectional view of an essential portion of a high-pressure water electrolysis cell that is included in a differential pressure water electrolysis system according to a third exemplary embodiment of the present disclosure.

DESCRIPTION OF THE EMBODIMENTS

Figure 1:
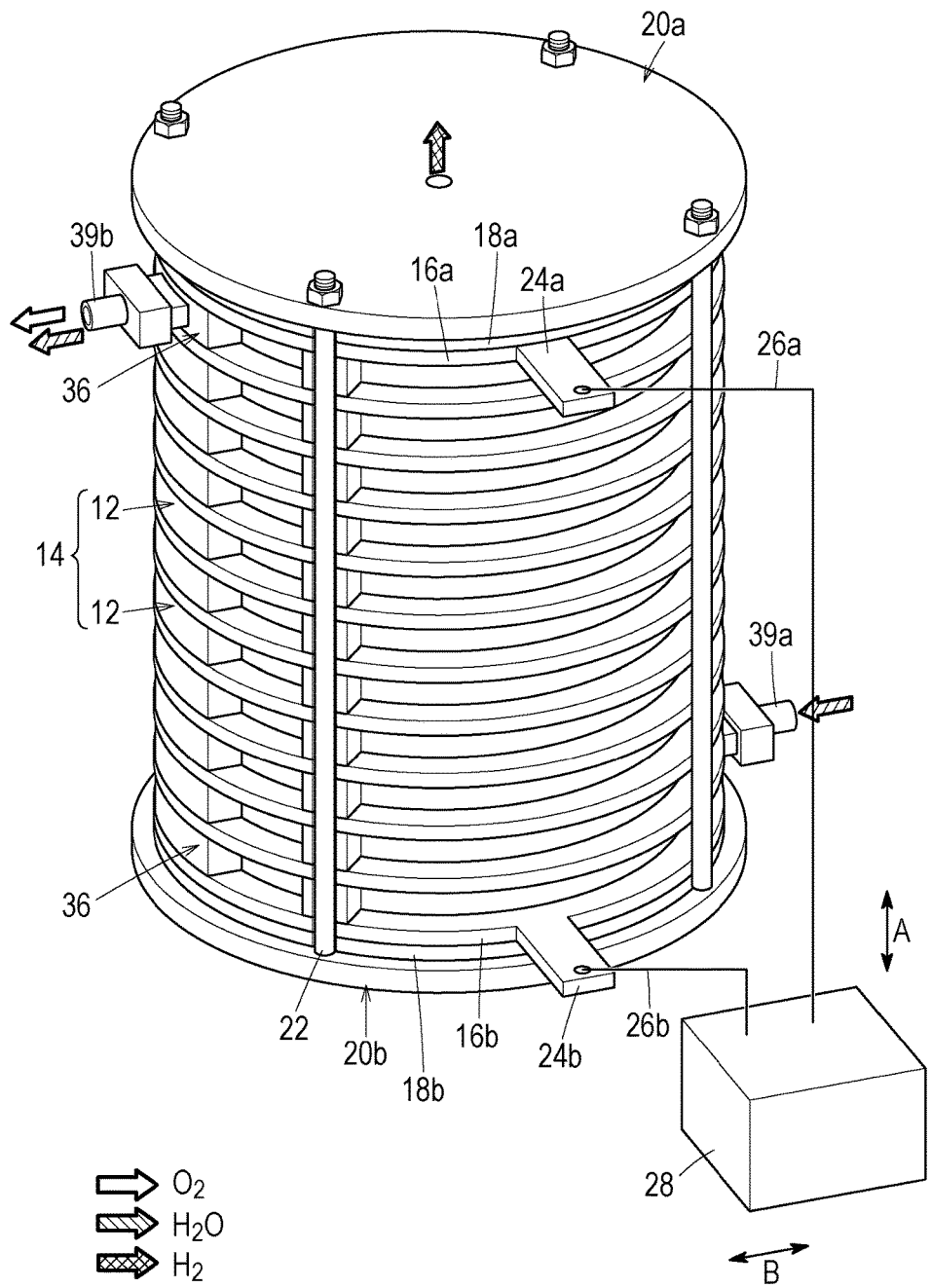
FIG. 1 is a perspective view for describing a differential pressure water electrolysis system according to a first exemplary embodiment of the present disclosure.

The embodiments will now be described with reference to the accompanying drawings, wherein like reference numerals designate corresponding or identical elements throughout the various drawings.

As illustrated in FIG. 1, a differential pressure water electrolysis system 10 according to a first exemplary embodiment of the present disclosure includes a fuel cell stack 14 in which a plurality of high-pressure water electrolysis cells 12 are stacked in the vertical direction (an arrow A direction) or in the horizontal direction (an arrow B direction).

A terminal plate 16a, an insulation plate 18a, and an end plate 20a are sequentially disposed upwards at one end (an upper end) of the fuel cell stack 14 in the stacking direction. A terminal plate 16b, an insulation plate 18b, and an end plate 20b are sequentially disposed downwards at the other end (a lower end) of the fuel cell stack 14 in the stacking direction.

The differential pressure water electrolysis system 10 is fastened in the stacking direction by having a portion between the disc shaped end plates 20a and 20b be fastened and held in an integrated manner with a pressing mechanism, namely, four tie rods 22 that extend in the arrow A direction, for example. Note that the differential pressure water electrolysis system 10 may employ a configuration in which the differential pressure water electrolysis system 10 is held in an integrated manner with a box-shaped casing (not shown) including the end plates 20a and 20b serving as the end plates. Furthermore, the overall differential pressure water electrolysis system 10 having a substantially columnar shape may be configured to have various shapes such as a rectangular parallelepiped shape.

Terminals 24a and 24b that protrude outwards are provided in the side portions of the terminal plates 16a and 16b. The terminals 24a and 24b are electrically connected to an electrolysis power source 28 through wires 26a and 26b, respectively.

Figure 2:
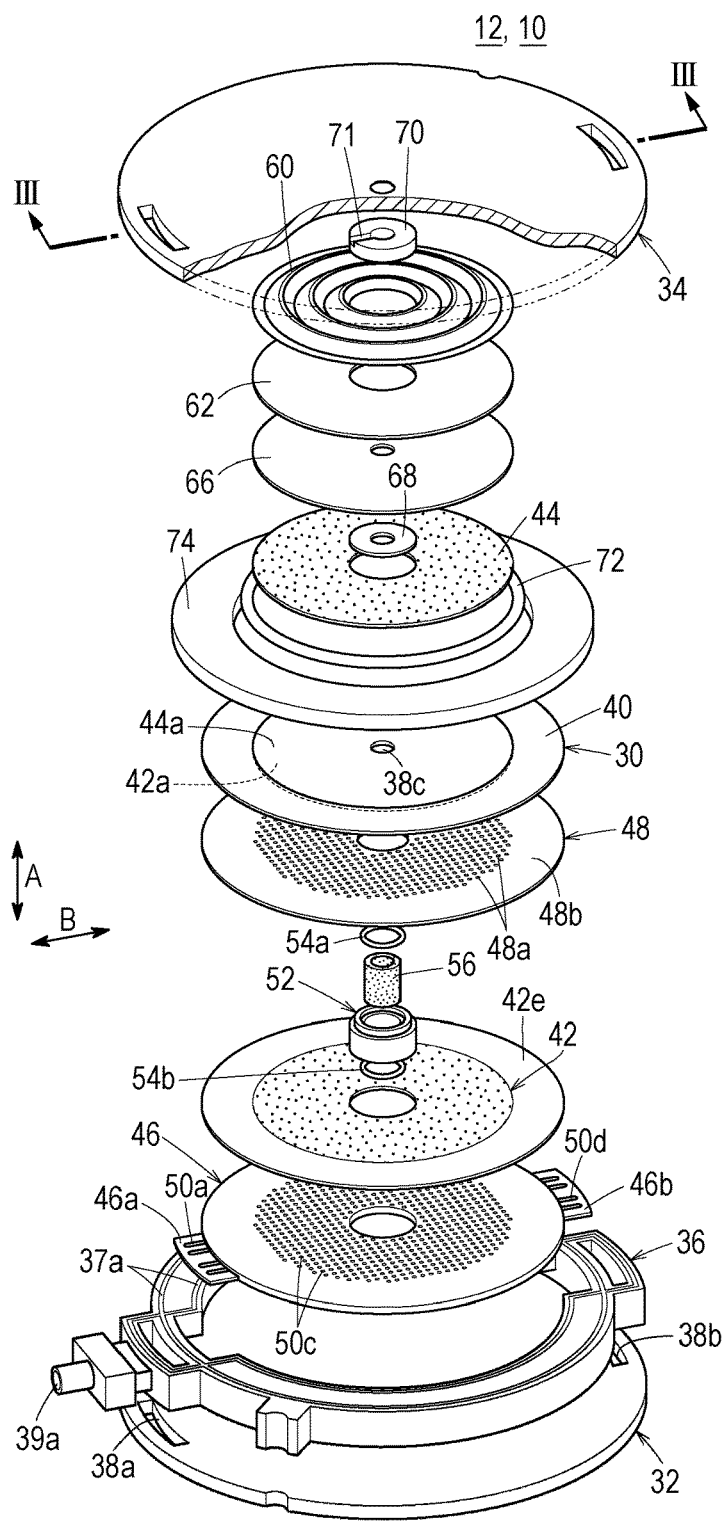
FIG. 2 is an exploded perspective view for describing a high-pressure water electrolysis cell included in the differential pressure water electrolysis system.
Figure 3:
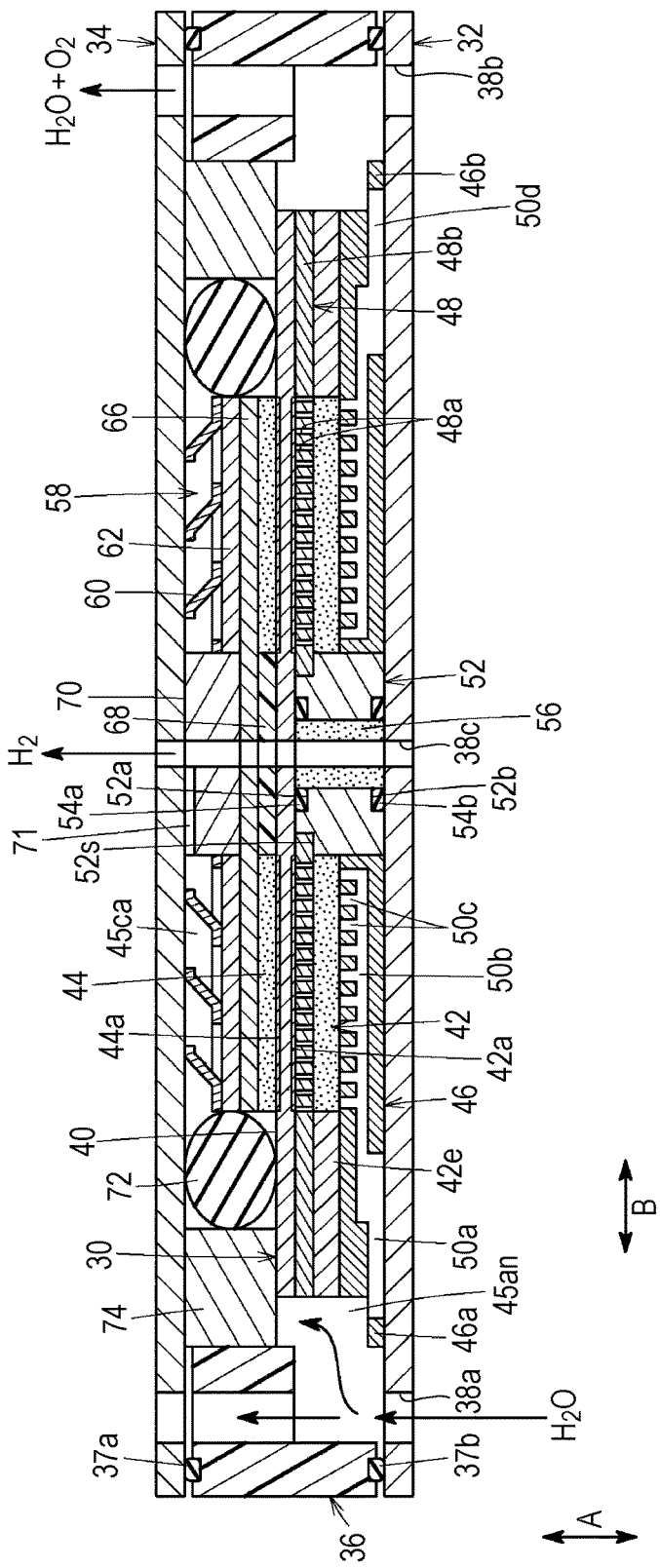
FIG. 3 is a cross sectional view of the high-pressure water electrolysis cell taken along line III-III in FIG. 2.

As illustrated in FIGS. 2 and 3, each high-pressure water electrolysis cell 12 includes a substantially discoidal electrolyte membrane-electrode structure 30, and an anode separator 32 and a cathode separator 34 that hold the electrolyte membrane-electrode structure 30 therebetween. A resin frame member 36 is disposed between the anode separator 32 and the cathode separator 34 so as to surround the electrolyte membrane-electrode structure 30.

The resin frame member 36 has a substantially ring shape and is provided with sealing members 37a and 37b in the two surfaces thereof. Water inlet manifolds 38a that are in communication with each other in the stacking direction (the arrow A direction) for supplying water (pure water) are provided at one ends of the resin frame members 36 in a diametric direction. Water outlet manifolds 38b for discharging oxygen that has been generated by reaction and unreacted water (a fluid mixture) are provided at the other ends of the resin frame members 36 in the diametric direction.

As illustrated in FIG. 1, a water supply port 39a that is in communication with the water inlet manifolds 38a is connected to the side portion of the lowest resin frame member 36 in the stacking direction. A water discharge port 39b that is in communication with the water outlet manifolds 38b is connected to the side portion of the highest resin frame member 36 in the stacking direction.

High pressure hydrogen manifolds 38c that are in communication with each other and that penetrate the substantially center of the electrolysis area are provided in the center portions of the high-pressure water electrolysis cells 12 (see FIGS. 2 and 3). The high pressure hydrogen manifolds 38c discharge high pressure hydrogen that has been generated by reaction (hydrogen that is higher in pressure then the pressure of the generated oxygen, 1 MPa to 80 MPa, for example).

Each anode separator 32 and each cathode separator 34 have a substantially disc shape and are configured of, for example, a carbon member. Other than the carbon member, each anode separator 32 and each cathode separator 34 may be formed by pressing a steel plate, a stainless steel plate, a titanium plate, an aluminum plate, a plated steel plate, or a metal plate on which anticorrosive surface treatment has been applied to its metal surface. Alternatively, anticorrosive surface treatment may be applied after machining has been performed.

Each electrolyte membrane-electrode structure 30 is provided with a solid polymer electrolyte membrane (an electrolyte membrane) 40 that has a substantially ring shape. Each solid polymer electrolyte membrane 40 is held between an anode current collector 42 and a cathode current collector 44 for electrolysis having a ring shape. Each solid polymer electrolyte membrane 40 is configured of a hydrocarbon (HC)-based membrane or a fluorine-based membrane, for example.

Each high pressure hydrogen manifold 38*c* is formed in a substantially center portion of the corresponding solid polymer electrolyte membrane 40. An anode electrode catalyst layer 42*a* that has a ring shape is provided on one surface of the solid polymer electrolyte membrane 40. A cathode electrode catalyst layer 44*a* that has a ring shape is formed on the other surface of the solid polymer electrolyte membrane 40. Each anode electrode catalyst layer 42*a* employs a ruthenium (Ru)-based catalyst, for example, and each cathode electrode catalyst layer 44*a* employs a platinum catalyst, for example.

Each anode current collector 42 and each cathode current collector 44 are configured of a spherical gas atomizing titanium powder sintered compact (porous conductor), for example. Each anode current collector 42 and each cathode current collector 44 are provided with a smooth surface portion on which etching process has been performed after grinding. The porosities of each anode current collector 42 and each cathode current collector 44 are set within the range of 10% to 50%, more preferably, 20% to 40%. A frame portion 42*e* is fitted to the outer peripheral edge portion of each anode current collector 42. The frame portions 42*e* are finer than the anode current collectors 42. Note that by having the outer peripheral portion of each anode current collector 42 be formed in a fine manner, the outer peripheral portion may serve as the frame portion 42*e*.

Each anode separator 32 includes (or defines) an anode chamber 45*an* in which the anode current collector 42 is accommodated, and each cathode separator 34 includes (or defines) a cathode chamber 45*ca* in which the cathode current collector 44 is accommodated.

A water flow passage member 46 is interposed between each anode separator 32 and the corresponding anode current collector 42 (the anode chamber 45*an*), and a protection sheet member 48 is interposed between each anode current collector 42 and the corresponding anode electrode catalyst layer 42*a*. As illustrated in FIG. 2, each water flow passage member 46 has a substantially disk-shape, and an inlet projection portion 46*a* and an outlet projection portion 46*b* are formed on the outer peripheral portion thereof so as to oppose each other.

A supply connection passage 50*a* that is in communication with a corresponding water inlet manifold 38*a* is formed in each inlet projection portion 46*a*. The supply connection passage 50*a* is in communication with a water flow passage 50*b* (see FIG. 3). A plurality of hole portions 50*c* are in communication with the water flow passage 50*b*, and the hole portions 50*c* are open towards the anode current collector 42. A discharge connection passage 50*d* that is in communication with a corresponding water flow passage 50*b* is formed in each outlet projection portion 46*b*. Each discharge connection passage 50*d* is in communication with the corresponding water outlet manifold 38*b*.

An inner peripheral position of each protection sheet member 48 is disposed on the inner side with respect to the inner peripheral positions of the corresponding anode current collector 42 and cathode current collector 44, and an outer peripheral position of each protection sheet member 48 is set at the same position as the outer peripheral positions of the corresponding solid polymer electrolyte membrane 40, anode current collector 42, and water flow passage member 46. The protection sheet member 48 includes a plurality of through holes 48*a* that are provided in an area (the electrolysis area) opposing the anode electrode catalyst layer 42*a* in the stacking direction. The protection sheet member 48 includes a frame portion 48*b* on the outside of the electrolysis area. A rectangular hole portion (not shown) is formed in the frame portion 48*b*.

Manifold members 52 that each surround the corresponding high pressure hydrogen manifold 38*c* are each disposed between the corresponding anode separator 32 and solid polymer electrolyte membrane 40. Each manifold member 52 has a substantially columnar shape and seal chambers 52*a* and 52*b* are provided at the two ends of the manifold member 52 in the axial direction by cutting out ring shapes in the manifold member 52. Sealing members (O-rings) 54*a* and 54*b* that encircle and seal the high pressure hydrogen manifolds 38*c* are disposed in each of the seal chambers 52*a* and 52*b*. Groove portions 52*s* in which the protection sheet members 48 are disposed are formed in the end faces of the manifold members 52 that oppose the solid polymer electrolyte membranes 40.

Cylindrical porous members 56 are disposed between the seal chambers 52*a* and 52*b*, and the high pressure hydrogen manifolds 38*c*. High pressure hydrogen manifolds 38*c* are formed in the center portions of the porous members 56. The porous members 56 are deposed between the anode separators 32 and the solid polymer electrolyte membranes 40. While the porous members 56 are each formed of a ceramic porous material, a resin porous material, or a porous material formed of a mixed material of ceramic and resin, various other materials may be used.

The porous members 56 each have a function of protecting the sealing members 54*a* and 54*b* and a pore size D of each of the porous members 56 is obtained by a formula: tensile stress=(external force×$\pi D^2$/4)/$\pi D$. For example, when the external force is 77 MPa and the tensile stress is a tensile stress related to the O-rings that are to be protected, then the pore size D will be about 30 μm. The pore size D of the O-ring needs to be set below the breaking strength of the relevant O-ring.

As illustrated in FIGS. 2 and 3, the cathode current collectors 44 and load application mechanisms 58 that press the cathode current collectors 44 against the solid polymer electrolyte membranes 40 are disposed in the cathode chambers 45*ca*. The load application mechanisms 58 each include an elastic member, for example, a plate spring 60. The plate springs 60 apply load to the cathode current collectors 44 through metal plate spring holders (shim members) 62. Note that other than the plate springs 60, for example, disk springs or coil springs may be used as the elastic members.

Conductive sheets 66 are disposed between the cathode current collectors 44 and the plate spring holders 62. The conductive sheets 66 are each configured of a metal sheet made of titanium, SUS, iron, or the like, and each have a ring shape. The conductive sheets 66 are configured so as to have a diameter that is substantially the same as that of the cathode current collectors 44.

An insulation member, for example, a resin sheet 68, is disposed at the center portion of each cathode current collector 44 and between the corresponding conductive sheet 66 and solid polymer electrolyte membrane 40. The resin sheets 68 fit into the inner peripheral surfaces of the cathode current collectors 44. The resin sheets 68 are set with thicknesses that are substantially the same as those of the cathode current collectors 44. For example, PEN (polyethylenenaphtalate) or polyimide films are used as the resin sheets 68.

Manifold members 70 are disposed between the resin sheets 68 and cathode separators 34. The manifold members 70 each have a cylindrical shape, and the high pressure hydrogen manifolds 38c are formed at the center portion of the manifold members 70. Hydrogen discharge passages 71 that communicate the cathode chambers 45ca and the high pressure hydrogen manifolds 38c to each other are formed at one ends of the manifold members 70 in the axial direction.

Sealing members (O-rings) 72 that encircle the outer peripherals of the cathode current collectors 44, the plate spring holders 62, and the conductive sheets 66 are disposed in the cathode chambers 45ca. Pressure resistant members 74 are disposed at the outer peripherals of the sealing members 72. The pressure resistant members 74 each have a substantially ring shape, and the outer peripheral portions thereof fit into the inner peripheral portions of the resin frame members 36.

An operation of the differential pressure water electrolysis system 10 configured in the above manner will be described below.

As illustrated in FIG. 1, water is supplied to the water inlet manifolds 38a of the differential pressure water electrolysis system 10 from the water supply port 39a, and voltage is applied to the terminals 24a and 24b of the terminal plates 16a and 16b through the electrolysis power source 28. Accordingly, as illustrated in FIG. 3, in each high-pressure water electrolysis cell 12, water is supplied to the water flow passage 50b of the water flow passage member 46 from the water inlet manifold 38a through the supply connection passage 50a. The water is supplied to the anode current collector 42 through the plurality of hole portions 50c and moves into the anode current collector 42.

Accordingly, the water is decomposed in the anode electrode catalyst layer 42a by electricity and hydrogen ions, electrons, and oxygen are generated. The hydrogen ions that have been generated by anodic reaction permeate the solid polymer electrolyte membrane 40, are transferred to the cathode electrode catalyst layer 44a side, and are combined with the electrons such that hydrogen is obtained.

Accordingly, hydrogen flows along the hydrogen flow passage inside the cathode current collector 44 and is discharged to the high pressure hydrogen manifold 38c through the hydrogen discharge passage 71. The hydrogen being maintained at a pressure that is higher than the pressure inside the water inlet manifold 38a flows through the high pressure hydrogen manifold 38c so as to be capable of being ejected to the outside of the differential pressure water electrolysis system 10. Meanwhile, oxygen generated by the reaction and unreacted water are discharged to the outside of the differential pressure water electrolysis system 10 from the water outlet manifold 38b through the water discharge port 39b.

Subsequently, when the operation of the differential pressure water electrolysis system 10 is stopped, since the pressure difference between the anode chamber 45an on the normal pressure side and the cathode chamber 45ca on the high pressure side is canceled, a pressure releasing (a decompressing) process is performed in the cathode chamber 45ca.

In the above case, in the first exemplary embodiment, as illustrated in FIG. 3, the porous member 56 is disposed in the manifold member 52 at a portion between the seal chambers 52a and 52b, and the high pressure hydrogen manifold 38c. Accordingly, when releasing pressure from the high pressure hydrogen manifold 38c, the high-pressure hydrogen remaining in the seal chambers 52a and 52b is smoothly discharged to the high pressure hydrogen manifold 38c through the vacant spaces (pores) inside the porous member 56. Therefore, the sealing members 54a and 54b can be desirably prevented from expanding and from being damaged.

Specifically, pores in the order of a micron can be formed inside the porous member 56. On the other hand, for example, since the minimum hole diameter of the pressure release passages formed by machining is about 0.5 mm, damage to the sealing members 54a and 54b is caused easily. In other words, by using the porous member 56, damage to the sealing members 54a and 54b can be prevented to the extent possible.

With the above, in the first exemplary embodiment, an effect in that damage to the sealing members 54a and 54b and the solid polymer electrolyte membrane 40 can be reliably prevented with a simple and economical configuration is obtained.

Figure 4:
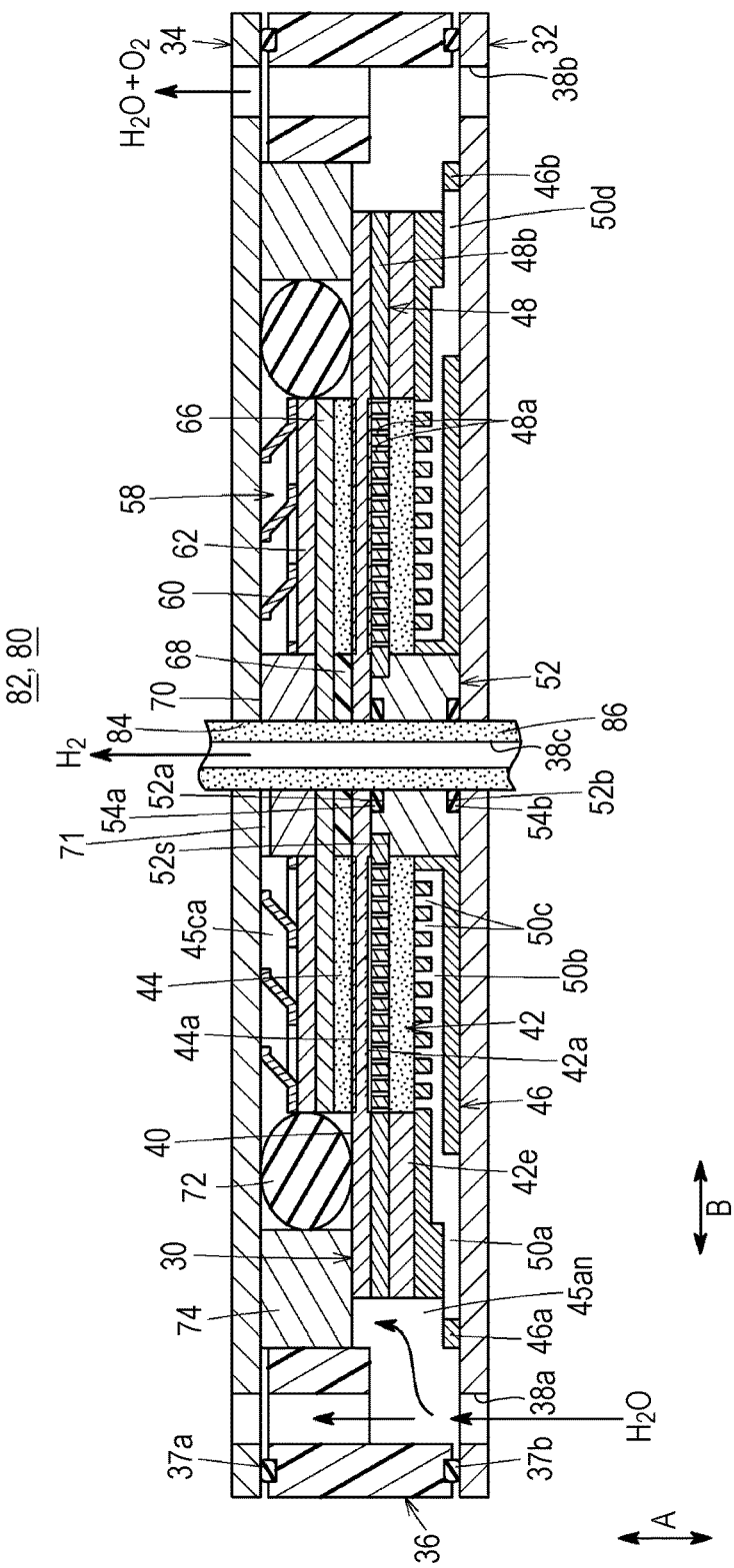
FIG. 4 is an explanatory drawing illustrating a sectional view of an essential portion of a high-pressure water electrolysis cell that is included in a differential pressure water electrolysis system according to a second exemplary embodiment of the present disclosure.

FIG. 4 is an explanatory drawing illustrating a sectional view of an essential portion of a high-pressure water electrolysis cell 82 that is included in a differential pressure water electrolysis system 80 according to a second exemplary embodiment of the present disclosure.

Note that components that are the same as those of the differential pressure water electrolysis system 10 according to the first exemplary embodiment will be attached with the same reference numerals and detailed description thereof is omitted. Furthermore, same applies to a third exemplary embodiment described below and detailed description thereof is omitted.

The high-pressure water electrolysis cell 82 integrally includes hole portions 84 between the anode separators 32 and the cathode separators 34. The hole portions 84 are concentric with the high pressure hydrogen manifolds 38c and have diameters that are larger than those of the high pressure hydrogen manifolds 38c. A porous member 86 is inserted in the hole portion 84. The porous member 86, extending between the end plates 20a and 20b illustrated in FIG. 1, is disposed so as to be inserted in the plurality of high-pressure water electrolysis cells 82 in an integral manner. A high pressure hydrogen manifold 38c is formed in the long porous member 86 extending in the arrow A direction.

In the second exemplary embodiment configured in the above manner, since a single porous member 86 is integrally inserted in the plurality of high-pressure water electrolysis cells 82, the porous member 86 may include a function of positioning each high-pressure water electrolysis cell 82. Accordingly, efficiency of the assembly operation of the differential pressure water electrolysis system 80 is improved and the number of parts can be reduced easily.

Moreover, the second exemplary embodiment can obtain similar effects as those of the first exemplary embodiment described above, such as prevention of damage to the sealing members 54a and 54b and the solid polymer electrolyte membrane 40 in a reliable manner with a simple and economical configuration.

FIG. 5 is an explanatory drawing illustrating a sectional view of an essential portion of a high-pressure water electrolysis cell 92 that is included in a differential pressure water electrolysis system 90 according to a third exemplary embodiment of the present disclosure.

The high-pressure water electrolysis cell 92 includes a porous member 94 in place of the porous member 56. The porous member 94 includes a step 96 in the end face that opposes the solid polymer electrolyte membrane 40.

In the third exemplary embodiment configured in the above manner, the high-pressure hydrogen remaining in the corner portions between the sealing members 54a and the seal chamber 52a is smoothly discharged to the anode chamber 45an through the step 96. With the above, during a pressure releasing process, discharge of the high-pressure hydrogen from the seal chamber 52a is desirably performed, and similar effects as those of the first and second exemplary embodiments described above can be obtained.

The present disclosure is related to the above kind of technology and describes a differential pressure water electrolysis system that is configured in a simple and economical manner, that is capable of smoothly discharging hydrogen remaining in a seal chamber when releasing pressure, and that is capable of reliably preventing damage to the sealing member and to an electrolyte membrane.

A differential pressure water electrolysis system according to the present disclosure includes a plurality of high-pressure water electrolysis cells. Each high-pressure water electrolysis cell includes an electrolyte membrane, an anode current collector and a cathode current collector that hold the electrolyte in between, and an anode separator and a cathode separator. Each anode separator includes an anode chamber in which the anode current collector is accommodated, and each cathode separator includes a cathode chamber in which the cathode current collector is accommodated. An elastic member that presses the cathode current collector against the electrolyte membrane is provided between the cathode current collector and the cathode separator.

The differential pressure water electrolysis system includes a high-pressure water electrolysis cell that electrolyzes water that has been supplied, the high-pressure water electrolysis cell generating oxygen on an anode current collector side and generating hydrogen, on the cathode current collector side, that has a pressure that is higher than a pressure of the oxygen. Furthermore, a plurality of high-pressure water electrolysis cells are stacked, end plates are disposed on the two ends of the differential pressure water electrolysis system in a stacking direction, and a high pressure hydrogen manifold that distributes the high-pressure hydrogen in the stacking direction is provided.

The high-pressure water electrolysis cell is disposed between the anode separator and the electrolyte membrane and includes a manifold member that surrounds the high pressure hydrogen manifold. The manifold member includes a seal chamber in which a sealing member that encircles and seals the high pressure hydrogen manifold is disposed. A cylindrical porous member is disposed in each manifold member between the corresponding seal chamber and the corresponding high pressure hydrogen manifold.

Furthermore, in the differential pressure water electrolysis system, a cylindrical porous member that extends between the end plates may be integrally disposed between the seal chamber and the high pressure hydrogen manifold.

According to the present disclosure, the cylindrical porous member is disposed between the seal chamber and the high pressure hydrogen manifold in each manifold member or between the end plates. Accordingly, when releasing pressure from the high pressure hydrogen manifold, the hydrogen remaining in the seal chamber is smoothly discharged passing through the vacant spaces inside the porous member. Accordingly, with a simple and economical configuration, damage to the sealing member and the electrolyte membrane can be prevented in a reliable manner when releasing pressure.

Obviously, numerous modifications and variations of the present invention are possible in light of the above teachings. It is therefore to be understood that within the scope of the appended claims, the invention may be practiced otherwise than as specifically described herein.

What is claimed is:

1. A differential pressure water electrolysis system comprising:
   high-pressure water electrolysis cells stacked in a stacking direction to form a fuel cell stack having a first end and a second end opposite to the first end in the stacking direction;
   first and second end plates disposed at the first and second ends of the fuel cell stack, respectively;
   a high pressure hydrogen manifold provided to distribute hydrogen in the stacking direction;
   each of the high-pressure water electrolysis cells comprising:
      an electrolyte membrane;
      an anode current collector and a cathode current collector that hold the electrolyte membrane between the anode current collector and the cathode current collector;
      an anode separator defining an anode chamber in which the anode current collector is accommodated;
      a cathode separator defining a cathode chamber in which the cathode current collector is accommodated;
      an elastic member disposed between the cathode current collector and the cathode separator to press the cathode current collector against the electrolyte membrane;
      a manifold member that is disposed between the anode separator and the electrolyte membrane to surround the high pressure hydrogen manifold and that includes a seal chamber in which a sealing member is disposed to encircle and seal the high pressure hydrogen manifold; and
      a cylindrical porous member disposed in the manifold member between the seal chamber and the high pressure hydrogen manifold; and
   each of the high-pressure water electrolysis cells being to electrolyze water that has been supplied to each of the high-pressure water electrolysis cells to generate oxygen on an anode current collector side and generate the hydrogen having a pressure higher than a pressure of the oxygen on a cathode current collector side.

2. A differential pressure water electrolysis system comprising:
   high-pressure water electrolysis cells stacked in a stacking direction to form a fuel cell stack having a first end and a second end opposite to the first end in the stacking direction;
   first and second end plates disposed at the first and second ends of the fuel cell stack, respectively;
   a high pressure hydrogen manifold provided to distribute hydrogen in the stacking direction;
   each of the high-pressure water electrolysis cells comprising:
      an electrolyte membrane;

an anode current collector and a cathode current collector that hold the electrolyte membrane between the anode current collector and the cathode current collector;

an anode separator defining an anode chamber in which the anode current collector is accommodated;

a cathode separator defining a cathode chamber in which the cathode current collector is accommodated;

an elastic member disposed between the cathode current collector and the cathode separator to press the cathode current collector against the electrolyte membrane; and a manifold member that is disposed between the anode separator and the electrolyte membrane to surround the high pressure hydrogen manifold and that includes a seal chamber in which a sealing member is disposed to encircle and seal the high pressure hydrogen manifold;

a cylindrical porous member extending between the first and second end plates and integrally disposed between the seal chamber and the high pressure hydrogen manifold; and each of the high-pressure water electrolysis cells being to electrolyze water that has been supplied to each of the high-pressure water electrolysis cells to generate oxygen on an anode current collector side and generate the hydrogen having a pressure higher than a pressure of the oxygen on a cathode current collector side.

3. The differential pressure water electrolysis system according to claim 1,
wherein the high pressure hydrogen manifold is provided in center portions of the high-pressure water electrolysis cells and extends through the high-pressure water electrolysis cells in the stacking direction.

4. The differential pressure water electrolysis system according to claim 1,
wherein the cylindrical porous member is disposed between the anode separator and the electrolyte membrane in the stacking direction.

5. The differential pressure water electrolysis system according to claim 1,
wherein the cylindrical porous member is made of one of a ceramic porous material, a resin porous material, and a porous material made of a mixed material of ceramic and resin.

6. The differential pressure water electrolysis system according to claim 1,
wherein each of the high-pressure water electrolysis cells includes a sealing member between the cathode separator and the electrolyte membrane in the stacking direction to encircle the cathode current collector and the elastic member.

7. The differential pressure water electrolysis system according to claim 1,
wherein each of the high-pressure water electrolysis cells includes a resin frame member between the anode separator and the cathode separator in the stacking direction to surround the electrolyte membrane, the anode current collector, and the cathode current collector, and wherein the resin frame member has a water inlet manifold through which the water is supplied and a water outlet manifold through which the oxygen and unreacted water are discharged.

8. The differential pressure water electrolysis system according to claim 7,
wherein a first sealing member is provided between the resin frame member and the anode separator and a second sealing member is provided between the resin frame member and the cathode separator.

9. The differential pressure water electrolysis system according to claim 2,
wherein the high pressure hydrogen manifold is provided in center portions of the high-pressure water electrolysis cells and extends through the high-pressure water electrolysis cells in the stacking direction.

10. The differential pressure water electrolysis system according to claim 2,
wherein the cylindrical porous member comprises a single porous member.

11. The differential pressure water electrolysis system according to claim 2,
wherein the cylindrical porous member is made of one of a ceramic porous material, a resin porous material, and a porous material made of a mixed material of ceramic and resin.

12. The differential pressure water electrolysis system according to claim 2,
wherein each of the high-pressure water electrolysis cells includes a sealing member between the cathode separator and the electrolyte membrane in the stacking direction to encircle the cathode current collector and the elastic member.

13. The differential pressure water electrolysis system according to claim 2,
wherein each of the high-pressure water electrolysis cells includes a resin frame member between the anode separator and the cathode separator in the stacking direction to surround the electrolyte membrane, the anode current collector, and the cathode current collector, and wherein the resin frame member has a water inlet manifold through which the water is supplied and a water outlet manifold through which the oxygen and unreacted water are discharged.

14. The differential pressure water electrolysis system according to claim 13,
wherein a first sealing member is provided between the resin frame member and the anode separator and a second sealing member is provided between the resin frame member and the cathode separator.

* * * * *